United States Patent
Roffman et al.

[11] Patent Number: 5,835,192
[45] Date of Patent: Nov. 10, 1998

[54] CONTACT LENSES AND METHOD OF FITTING CONTACT LENSES

[75] Inventors: Jeffrey H. Roffman; Edgar V. Menezes, both of Jacksonville; Yulin X. Lewis, Ponte Vedra Beach; Timothy R. Poling, Jacksonville, all of Fla.; Michel Guillon, London, England

[73] Assignee: Johnson & Johnson Vision Products, Inc., Jacksonville, Fla.

[21] Appl. No.: 576,289

[22] Filed: Dec. 21, 1995

[51] Int. Cl.⁶ .................................................. A61B 3/00
[52] U.S. Cl. ............................................ 351/246; 351/200
[58] Field of Search ................................. 351/247, 246, 351/212, 211, 205, 204, 200

[56] References Cited

U.S. PATENT DOCUMENTS

| | | |
|---|---|---|
| 4,923,296 | 8/1990 | Erickson . |
| 5,024,517 | 6/1991 | Seidner . |

FOREIGN PATENT DOCUMENTS

| | | |
|---|---|---|
| 0 201 231 A | 11/1986 | European Pat. Off. . |
| 0 453 136 A | 10/1991 | European Pat. Off. . |
| 0 061 845 A | 6/1994 | European Pat. Off. . |
| 0 601 846 A | 6/1995 | European Pat. Off. . |

*Primary Examiner*—Hung X. Dang

[57] ABSTRACT

A design family of contact lenses includes a central area utilized for distance vision, surrounded by multiple alternating annuli of near and distance optical powers, surrounded by a peripheral distance zone. The design can also be used in intraocular lenses (IOL). The distance optical power is constant across the design family of lenses, but the near optical power increases as a subject's presbyopia increases. The design family of contact lenses can be fitted to a patient in a standard fashion by fitting both eyes to the best distance visual acuity (VA), and obtaining near acuity from the near annuli. A modified monovision method fits the patient's dominant eye with a contact lens as described having the full prescription distance power and fitting the nondominant eye with a contact lens as described having a distance optical power between the full prescription distance optical power and the near optical power. Specifically, the nondominant eye is fitted with a contact lens as described but having a distance power between 50% and 100% of the range between the prescription near and distance optical powers, biased towards the distance optical power.

13 Claims, 2 Drawing Sheets

CONTACT LENSES AND METHOD OF FITTING CONTACT LENSES

BACKGROUND OF THE INVENTION

1. Field of the Invention

The present invention pertains to ophthalmic lenses, and in particular to contact lenses containing more than one optical power or focal length.

In greater detail, the present invention relates generally to a method for fitting concentric annular ring contact lenses to a presbyopic patient.

It is well known that as an individual ages, the eye is less able to accommodate, i.e. bend the natural lens in the eye in order to focus on objects which are relatively near to the observer. This condition is referred to as presbyopia, and presbyopes have in the past relied upon spectacles or other lenses having a number of different regions with different optical powers to which the wearer can shift his vision in order to find the appropriate optical power for the object or objects upon which the observer wishes to focus.

With spectacles this process involves shifting one's field of vision from typically an upper, far power to a lower, near power. With contact lenses, however, this approach has been less than satisfactory. The contact lens, working in conjunction with the eye's natural lens forms an image on the retina of the eye by focusing light incident on each part of the cornea from different field angles onto each part of the retina of the eye in order to form the image. This is demonstrated by the fact that as the pupil contracts in response to brighter light, the image on the retina does not shrink, but rather light coming through a smaller area of the lens constructs the entire image.

Similarly, for a person who has the natural lens of the eye removed because of a cataract condition and an intraocular lens inserted as a replacement, the ability to adjust the lens (accommodate) to the distance of the object being viewed is totally absent. In this case, the lens provided is usually set at a single infinite distance focal power, and spectacles are worn to provide the additional positive optical power needed for in-focus close vision. For such a patient, a functional multifocal lens would be particularly useful.

It is also known in the art that under certain circumstances the brain can discriminate between separate competing images by accepting the in-focus image and rejecting the out-of-focus image.

2. Discussion of the Prior Art

Roffman et al., U.S. Pat. No. 5,448,312 discloses a design family of contact lenses of the type for which the method of fitting contact lenses of the present invention was developed. Pursuant to this design family, an ophthalmic lens provides a cumulative ratio of distance to near focal length which is predominantly distance correction under high illumination, nearly evenly divided between distance and near vision corrections under moderate illumination, and again favoring distance vision correction under low level illumination. The lens is specifically adjusted to match the patient's pupil size as a function of illumination level, in a preferred embodiment by applying pupil size parameters as a function of age. This lens has the properties of matching the distribution of near and distance focal vision correction to the type of human activity typically undertaken in various illumination conditions, as well as matching particular lens dimensions to suit the size of the pupil as a function of illumination intensity.

One attempt known in the prior art to provide a method of compensating for presbyopia without complex lens manufacture is known as monvision. In a monovision system a patient is fitted with one contact lens for distant vision in one eye and a second contact lens for near vision in the other eye. Although it has been found that with monovision a patient can acceptably distinguish both distance and near objects, there is a substantial loss of binocularity, i.e. depth perception. For these reasons, although simple systems such as monovision are somewhat understood, more complex schemes for multifocal refractive lenses are primarily theoretical.

SUMMARY OF THE INVENTION

It is an object of the present invention to provide a method of fitting an ophthalmic lens for a presbyope which yields improved visual acuity in general, and in particular, matches the patient's focal requirements under various light intensity conditions.

It is a further object of the subject invention to provide a method for determining the manner in which such lenses are to be fitted to a patient to produce the desired improvement in vision, especially by matching the optical power required under various illumination situations to the patient's pupil diameter under such illumination conditions.

The above objectives of matching both distribution of near and distance focal vision correction to the type of human activity typically undertaken in various illumination conditions, as well as matching particular lens dimensions to suit the size of the pupil as a function of illumination intensity, is achieved by an ophthalmic lens designed to provide a cumulative ratio of distance to near focal length that is predominantly distance correction under high illumination, nearly evenly divided between distance and near corrections under moderate illumination, and again favoring distance vision correction under low level illumination. The lens is specifically adjusted to match the patient's pupil size as a function of illumination level, in a preferred embodiment by applying pupil size parameters as a function of age.

In accordance with the teachings herein, the present invention provides a method of fitting a presbyopic patient, having a prescription distance optical power and near optical power, with a design family of contact lenses. The design family includes a central area of the contact lens which is utilized for distance vision, surrounded by multiple alternating annuli of near and distance optical powers, surrounded by a peripheral distance optical power zone. The method comprises fitting the patient's dominant eye with a contact lens of the design family having the full prescription distance optical power, and fitting the patient's nondominant eye with a contact lens of the design family having a distance optical power which is intermediate the full prescription distance optical power and the near optical power. The design strategy of this method is to enhance the patient's near vision in the nondominant eye.

In greater detail, the nondominant eye is fitted with a contact lens of the design family having a distance power between 50% and 100% of the range between the prescription near and distance optical powers, biased towards the prescription distance optical power. Stated alternatively, the nondominant eye is fitted with a contact lens of the design family having a lesser distance optical power than the full prescription distance optical power but still greater than 50% of the range between the prescription near and distance optical powers, biased towards the prescription distance optical power.

A preferred embodiment of a contact lens places the above described features on the back surface of the lens. The design can also be used in intraocular lenses (IOL). The distance optical power is constant across the design family of lenses, but the near optical power increases as a subject's presbyopia increases.

BRIEF DESCRIPTION OF THE DRAWINGS

The foregoing objects and advantages of the present invention for a method for fitting concentric annular ring contact lenses for presbyopia may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
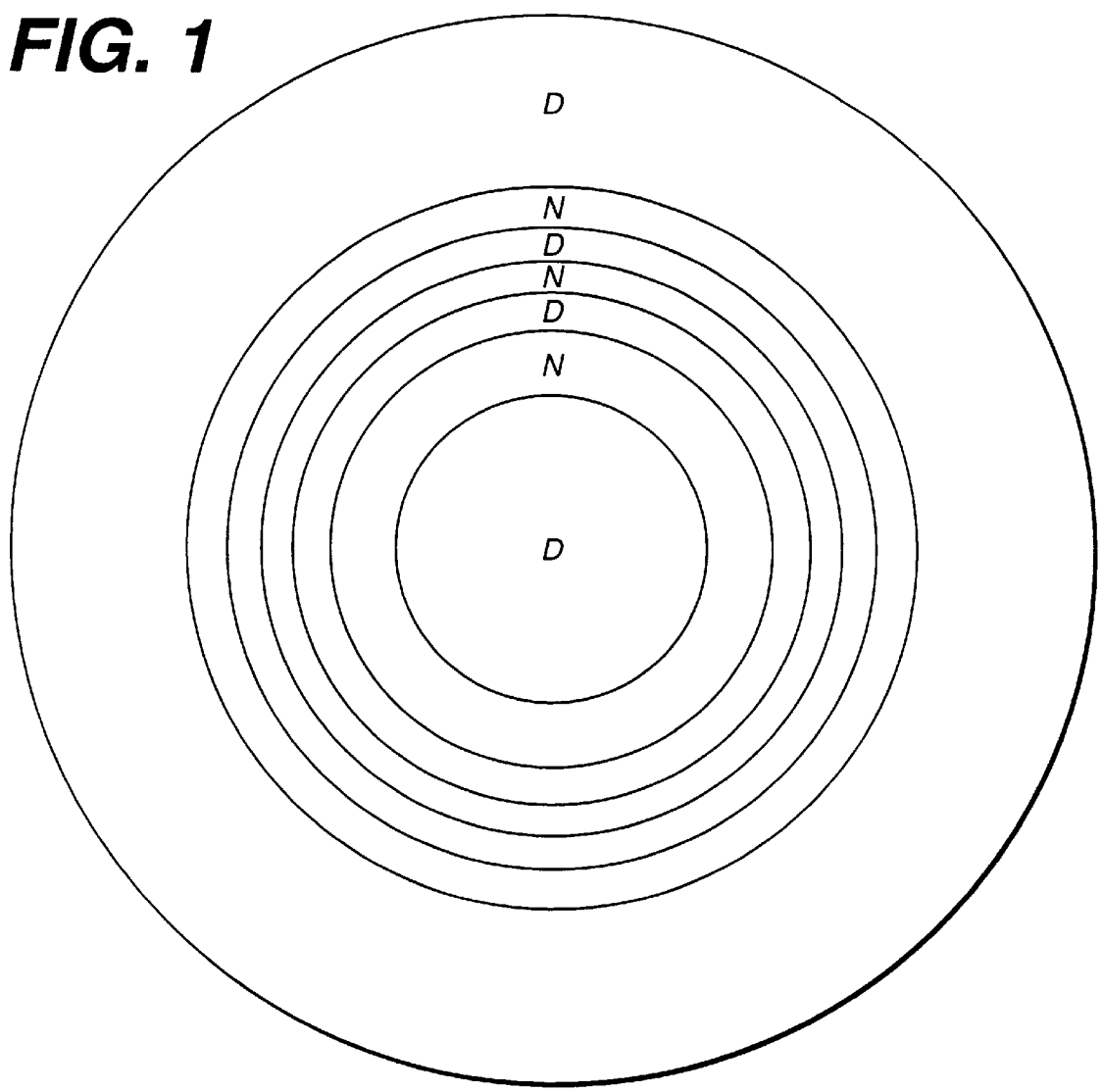
FIG. 1 shows the optical zone of an ophthalmic contact lens constructed according to the principles of the present invention.
Figure 3:
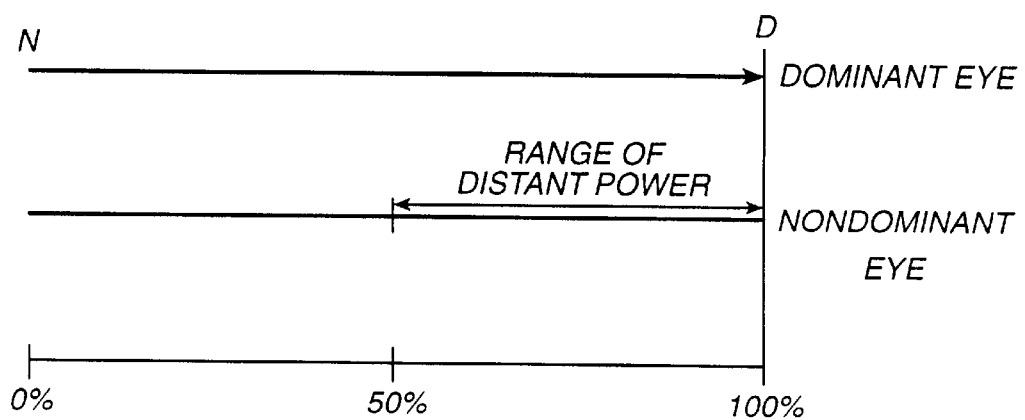
FIG. 3 illustrates graphically the range of optical power to be fitted to a patient's nondominant eye.

It has been discovered that previous measurements of horizontal pupil size and the generally accepted statistics based on those sizes have been generated primarily from students of optometry and ophthalmology because of their ready availability and eagerness to cooperate in such studies. It has been discovered however, that the pupil size and thus area differ significantly for those who are older than the typical student of optometry or ophthalmology.

Because the pupil size is a function of light intensity, it is an important parameter in the design of ophthalmic lenses, particularly contact lenses and intraocular lenses. It has been found that the shortcomings of many of these lenses can, in part, be attributed to wrong assumptions used in the pupil size as a function of illumination intensity.

Reliable data was obtained from people in four different age groups, those less than 20 years of age, those between 20 and 40 years of age, those between 40 and 60 years of age, and those over 60 years of age. These pupil measurements were made on test subjects at three different luminance levels, 250, 50, and 2.5 candellas per square meter ($cd/m^2$).

The 250 $cd/m^2$ level corresponds to extremely bright illumination typically outdoors in bright sunlight. The 50 $cd/^2$ is a mixed level which is found both indoors and outdoors. Finally, the 2.5 $cd/m^2$ level is most typically found outdoors at night, usually in an uneven illumination situation such as night driving.

The results of these studies are given in the following Table I, which includes in addition to average pupil diameter at three different illumination levels, the standard deviation in the diameter and the range associated therewith.

TABLE I

| Illumination ($candellas/m^2$) | HORIZONTAL PUPIL SIZE | | |
|---|---|---|---|
| | Average Pupil Diameter (mm) | Standard Deviation (1Σ) | 1Σ Range |
| LESS THAN 20 YEARS OF AGE | | | |
| 2.5 | 6.5962 | 0.9450 | 4.2807 to 7.8562 |
| 50 | 4.3499 | 0.5504 | 3.4246 to 5.4641 |
| 250 | 3.4414 | 0.3159 | 2.8958 to 4.1799 |
| 20 to 40 YEARS OF AGE | | | |
| 2.5 | 6.4486 | 0.8259 | 3.6766 to 8.3598 |
| 50 | 4.4843 | 0.6342 | 2.5433 to 6.0936 |
| 250 | 3.5040 | 0.4217 | 2.4933 to 4.7843 |
| 40 to 60 YEARS OF AGE | | | |
| 2.5 | 5.4481 | 0.9787 | 3.3792 to 7.5289 |
| 50 | 3.6512 | 0.5692 | 2.3922 to 5.5396 |
| 250 | 3.0368 | 0.4304 | 2.1152 to 4.4066 |
| GREATER THAN 60 YEARS OF AGE | | | |
| 2.5 | 4.7724 | 0.6675 | 3.4749 to 6.3706 |
| 50 | 3.4501 | 0.5106 | 2.6944 to 5.4389 |
| 250 | 2.8260 | 0.3435 | 2.1008 to 4.0037 |

Taken in combination with this data are the determinations that have been made regarding real world human activity typically encountered under different illumination levels. At very high illumination levels, such as that represented by 250 $cd/m^2$, human activity is typically taking place outdoors in bright sunlight and requires distant vision tasks.

At 50 $cd/m^2$ illumination levels, activity usually occurs indoors and out, and typical human activity is represented by both near and far visual tasks.

Finally, at low illumination levels represented by the 2.5 $cd/m^2$, activity that takes place is typically outdoors at night and usually involves distant vision tasks, such as driving an automobile.

Specifically, an ophthalmic lens should be constructed of three general annular lens portions in a multifocal design, having only the patient's distance corrective power found in the central portion of the lens, substantially equal cumulative amounts of near and distance optical power focal correction for the patient in a first annular portion exterior to the central portion of the lens, and finally, a second annular portion with additional distance focal power near the periphery of the optical surface area of the ophthalmic lens. Each of these two annular portions of the lens optical surface is constructed of several optical zones, with each zone having near or distance optical power and working in combination to yield the desired focal ratio in that portion.

The corrective powers as a function of the distance from the center of the lens must be a function of the patient's specifically measured pupil diameter at varying illumination levels, or it can be readily determined from the above information based upon the age of the patient.

Referring now FIG. 1, there is shown the optical surface of an ophthalmic lens constructed according to the present invention. The typical contact lens is usually constructed with a non-optical lenticular area (not shown) outside optical surface for a total diameter of 14 mm. As can be seen from the Figure, the center and second annular (peripheral) portion of the optical surface of the lens is heavily biased toward distant vision. There is provided by the first annular portion, however, a preponderance of near vision optical power to provide under intermediate light conditions an approximately equal amount of near and distance focal length images.

Figure 2:
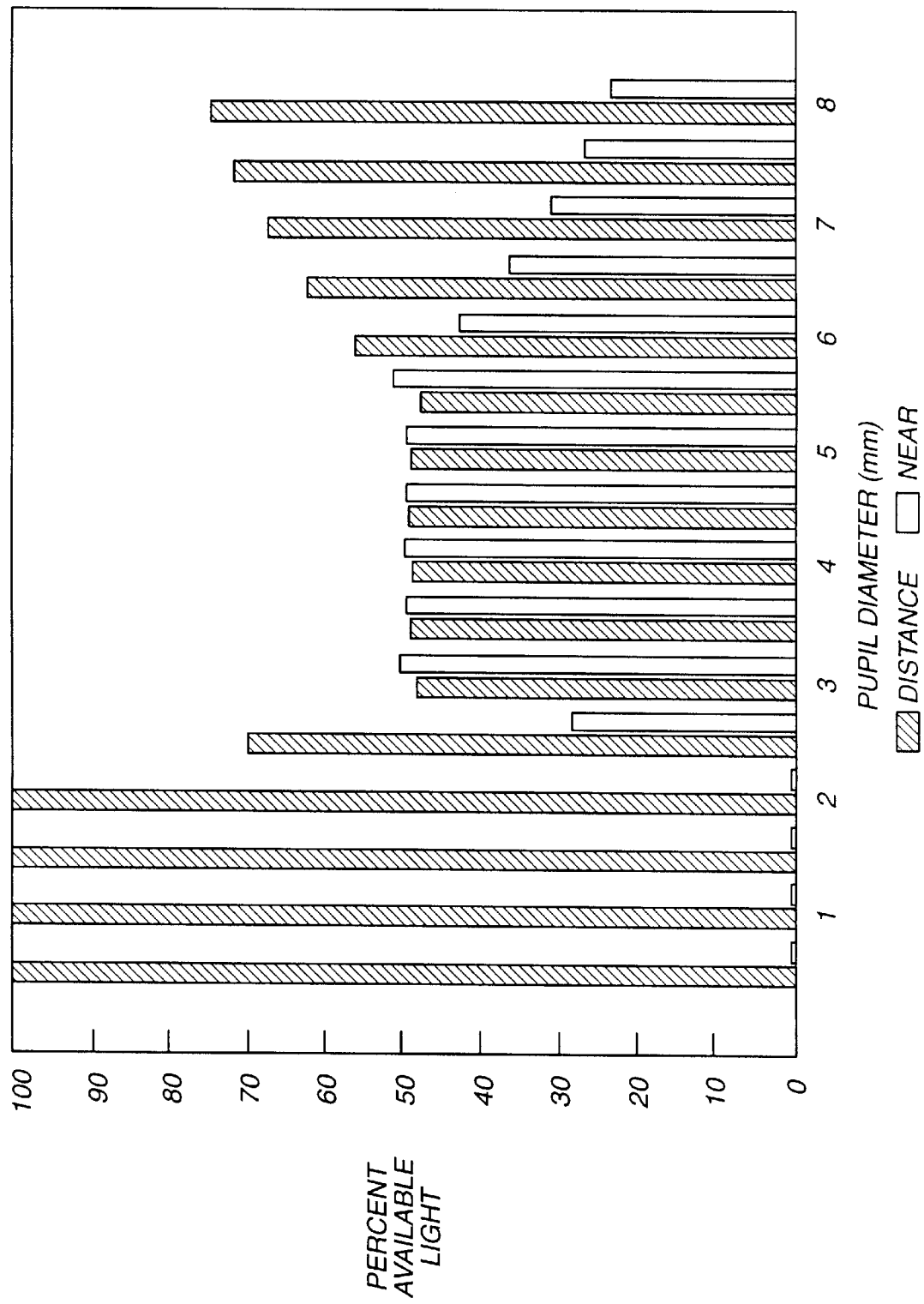
FIG. 2 is a bar graph comparing the fraction of near and distance focal lengths for the lens of FIG. 1 as a function of pupil diameter.

Referring to FIG. 2, there is shown in bar graph form a comparison between distant and near focal length image area as various pupil diameters for a lens constructed according to FIG. 1.

It is clear from this Figure that the above objective of having a predominant distant vision at small and large pupil diameters corresponding to high and extremely low level illumination intensities and nearly identical distance and near areas at intermediate diameters corresponding to moderate illumination levels has been achieved.

The design parameters for such a lens which is specifically designed to accommodate a person of an age between 40 years and 60 years is given in the following Table II. The appropriateness of this design for such an individual can be confirmed by referring back to Table I relating pupil size to patient age.

TABLE II

PUPIL-TUNED LENS

| Pupil Diameter | Pupil Percent (%) | Distance | Near |
|---|---|---|---|
| 0.00 | 0.00 | 100 | 0 |
| 0.50 | 6.3 | 100 | 0 |
| 1.00 | 12.5 | 100 | 0 |
| 1.50 | 18.8 | 100 | 0 |
| 2.00 | 25.0 | 100 | 0 |
| 2.15 | 26.9 | 0 | 100 |
| 2.50 | 31.3 | 0 | 100 |
| 3.00 | 37.5 | 0 | 100 |
| 3.30 | 41.3 | 100 | 0 |
| 3.50 | 43.8 | 100 | 0 |
| 3.80 | 47.5 | 0 | 100 |
| 4.00 | 50.0 | 0 | 100 |
| 4.30 | 53.8 | 100 | 0 |
| 4.50 | 56.3 | 100 | 0 |
| 4.80 | 60.0 | 0 | 100 |
| 5.00 | 62.5 | 0 | 100 |
| 5.35 | 66.9 | 100 | 0 |
| 5.50 | 68.8 | 100 | 0 |
| 6.00 | 75.0 | 100 | 0 |
| 6.50 | 81.3 | 100 | 0 |
| 7.00 | 87.5 | 100 | 0 |
| 7.50 | 93.8 | 100 | 0 |
| 8.00 | 100.0 | 100 | 0 |

In addition to the above considerations, in accordance with the teachings of the present invention, a method is provided of a fitting a presbyopic patient, having a prescription distance optical power and near optical power for each eye, with the design family of contact lenses as described herein. The design family includes a central area of the contact lens which is utilized for distance vision, surrounded by multiple alternating annuli of near and distance optical powers, surrounded by a peripheral distance optical power zone.

The method comprises fitting the patient's dominant eye with a contact lens of the design family having the full prescription distance optical power, and fitting the patient's nondominant eye with a contact lens of the design family having a distance optical power which is intermediate the full prescription distance optical power and the near optical power. The design strategy of this method is to enhance the patient's near vision in the nondominant eye. In greater detail, the nondominant eye is fitted with a contact lens of the design family having a distance power between 50% and 80% of the range between the prescription near and distance optical powers, biased towards the prescription distance optical power. Stated alternatively, the nondominant eye is fitted with a contact lens of the design family having a lesser distance optical power than the full prescription distance optical power for that eye, but still greater than 50% of the range between the prescription near and distance optical powers, biased towards the prescription distance optical power.

While several embodiments and variations of the present invention for a method for fitting concentric annular ring contact lenses for presbyopia are describe in detail herein, it should be apparent that the disclosure and teachings of the present invention will suggest many alternative designs to those skilled in the art.

What is claimed is:

1. A method of fitting a presbyopic patient, having a prescription distance optical power and near optical power, with a design family of contact lenses which includes a central area for distance vision, surrounded by multiple alternating annuli of near and distance optical powers, surrounded by a peripheral distance optical power zone comprising:

a. fitting the patient's dominant eye with a contact lens of the design family having the full prescription distance optical power; and b. fitting the patient's nondominant eye with a contact lens of the design family having a distance optical power which is intermediate the full prescription distance optical power and the near optical power.

2. A method of fitting a presbyopic patient with a design family of contact lenses as claimed in claim 1, wherein the nondominant eye is fitted with a contact lens of the design family but having a distance power between 50% and 100% of the range between the prescription near and distance optical powers, biased towards the prescription distance optical powers.

3. A method of fitting a presbyopic patient with a design family of contact lenses as claimed in claim 1, wherein the nondominant eye is fitted with a contact lens of the design family but having a lesser distance optical power than the full prescription distance optical power but still greater than 50% of the range between the prescription near and distance optical powers, biased towards the prescription distance optical power.

4. A method of fitting a presbyopic patient, having a prescription distance optical power and near optical power, with a design family of contact lenses which includes both a first refractive optical power and a second refractive optical power, one of said refractive optical powers being for distance vision and the other of said refractive optical powers being for near vision said lens containing an optical surface with a central portion having said first optical power focusing substantially all the incident light at the first optical power, a first annular portion exterior said central portion containing more second optical power area than first optical power area in the central and first annular portions combined, and a second annular portion exterior said first annular portion containing sufficient first optical power area such that the total first optical power area in the central, first annular and second annular portions combined is greater than the total second optical power area in the central, first annular and second annular portions combined, comprising a. fitting the patient's dominant eye with a contact lens of the design family having the full prescription distance optical power; and b. fitting the patient's nondominant eye with a contact lens of the design family having a distance optical power which is intermediate the full prescription distance optical power and the near optical power.

5. A method as claimed in claim 4, wherein the design family of lenses comprises annular portions of a concentric construction.

6. A method as claimed in claim 4, wherein in the design family of lenses, at least one said annular portion contains more than one optical power.

7. A method as claimed in claim 4, wherein the design family of lenses comprises a bifocal lens where the combined central portion and first annular portions focus about half of the incident light at the second optical power, and the combined central portion, first annular portion and second annular portion focus more than about half of the incident light at the first optical power.

8. A method as claimed in claim 4, wherein in the design family of lenses, said first optical power is a distance optical power and said second optical power is a near optical power.

9. A method of fitting a presbyopic patient, comprising:
 a. determining the pupil diameter of the patient as a function of illumination intensity;
 b. determining the near optic power required for each eye of the patient;
 c. determining the distance optical power required each eye of for the patient;
 d. one of said near and distance optical powers being a first optical power and the other of said powers being a second optical power;
 e. configuring a refractive ophthalmic lens to have a cumulative optical power ratio of near power to distance power which varies with radial distance from the lens center and corresponding to the patient's pupil diameter as a function of illumination intensity;
 f. said variation in cumulative optical power ratio of first optical power to second optical power with radial distance from the lens center corresponds to a central portion with said first optical power, a first annular portion exterior said central portion containing more second optical power area than first optical power area such that the total combined first and second area of the central and first annular portion are substantially equal, and a second annular portion exterior said first annular portion and containing sufficient first optical power area such that the total first optical power area in the central, first annular and second annular portions combined is greater than the total second optical power area in the central, first annular and second annular portions combined;
 g. fitting the patient's dominant eye with a contact lens having the full prescription distance optical power; and
 h. fitting the patient's nondominant eye with a contact lens having a distance optical power which is intermediate the full prescription distance optical power and the near optical power.

10. A method as claimed in claim 9, wherein said first optical power is the distance optical power and said second optical power is the near optical power.

11. A method as claimed in claim 9, wherein said patient pupil diameter as a function of illumination intensity is determined by ascertaining the patient's age.

12. A pair of contact lenses for a patient wherein each lens comprises a first refractive optical power and a second refractive optical power, one of said refractive optical powers being for distance vision and the other of said refractive optical powers being for near vision, and wherein one of said lenses has the full prescription distance optical power, and the second of said lenses comprises a distance optical power which is intermediate the full prescription distance optical power and the near optical power.

13. The pair of contact lenses of claim 12, wherein each lens comprises a central portion and annular rings surrounding said central portion, said central portion has said first optical power, the optical powers of said annular rings alternate between said second and said first optical powers, and said first optical power is for said distance vision.

* * * * *